United States Patent [19]

Morioka et al.

[11] 3,960,603
[45] June 1, 1976

[54] ALKALINE BATTERY

[75] Inventors: Yuji Morioka; Shigeo Dejima, both of Sumoto, Japan

[73] Assignee: Sanyo Electric Co., Ltd., Osaka, Japan

[22] Filed: Dec. 13, 1974

[21] Appl. No.: 532,397

[30] Foreign Application Priority Data
Apr. 15, 1974  Japan.............................. 49-42507
Nov. 29, 1974  Japan.............................. 49-38592

[52] U.S. Cl. .............................. 136/135 R; 136/13; 136/134 P
[51] Int. Cl.² ......................................... H01M 2/30
[58] Field of Search ................... 136/13, 14, 30, 28, 136/24, 100 R, 107, 134 P, 135, 6 C, 6 A, 175

[56] References Cited
UNITED STATES PATENTS

| | | |
|---|---|---|
| 3,393,095 | 7/1968 | Philipp.................................. 136/14 |
| 3,503,806 | 3/1970 | Sugalski................................. 136/13 |
| 3,505,121 | 4/1970 | Bougaran............................. 136/175 |
| 3,695,935 | 10/1972 | Cromer ............................. 136/134 P |
| 3,732,124 | 5/1973 | Cailley................................ 136/134 P |

Primary Examiner—Donald L. Walton
Attorney, Agent, or Firm—Armstrong, Nikaido & Wegner

[57]  ABSTRACT

An alkaline battery is provided which comprises a positive and negative electrode separated by a separator, each electrode having a bare conductive portion at one end. Current collectors comprising a thin conductive plate with numerous convexities or projections formed thereon are welded to the conductive parts. The convexities form conductive points with the conductive parts of the assembly.

5 Claims, 7 Drawing Figures

ALKALINE BATTERY

BACKGROUND OF THE INVENTION

1. Field of the Invention

This invention relates to an alkaline battery, such as nickel-cadmium, nickel-zinc, silver-zinc, etc. and more particularly to an alkaline battery which has a high discharge rate performance, a savings of materials and is easy to manufacture.

2. Description of the Prior Art

Taking a nickel-cadmium battery as an example of alkaline batteries, the battery consists essentially of a pair of electrodes, one a positive plate and the other a negative plate, a separator and a container.

Preparation of the positive or negative plates requires the sintering of a fine nickel powder on a metal carrier such as a punched metal or a woven wire screen. The positive electrode is made by impregnating hydrated nickel on the sintered plate as an active material and the negative electrode is made by impregnating hydrated cadmium on the sintered plate.

The battery cell is assembled by rolling both electrodes, separated by an insulation layer into a tight roll or core or by stacking them alternately.

As a method for affixing current collectors to each electrode, it is well known to form a current collector on the metal carrier by punching prior to the sintering process or to affix the current collector by welding a collecting terminal to the electrode after the impregnation of active materials.

However, in the former, material loss is inevitable due to the remaining parts of said metal carrier which are cut or punched. Furthermore, a complex process for cutting or punching of the current collector is required.

Also, the concentration of the current collecting point on said electrode has the disadvantage of causing low discharge rates for the cell. In the latter method, the process of welding the current collector on the electrode after impregnation with active materials is an extremely difficult technique and has the same disadvantage of low discharge rates for the cell.

U.S. Pat. No. 3,732,124 discloses an improved method for affixing the current collector to overcome the disadvantages explained above. In the method of this patent, a cell has an assembly of electrodes and separators. Opposite sides or ends of the electrodes have bared parts of the metal carriers, the projecting bared parts being respectively welded at the ends or sides of the assembly to a current collector member. The cell is further characterized in that each current collector member comprises edges substantially perpendicular to its principal plane and the edges being embedded by welding into the bared projecting parts of the respective electrodes. Consequently, the cell is more rugged and can bear higher discharge rates than the cell employing the previously described collectors.

As a result of practical application, it has been observed that the process described in U.S. Pat. No. 3,732,124 has several disadvantages which make it impractical. Namely, since the current collector and electrode are welded only at the embedded bent portion of the collector, joint strength between them is not enough and not reliable from a mass production stand point. Furthermore, in order to insure the embedding of the current collector into the electrode, sufficient size of the bared projection portion at the edge of each electrode is required.

SUMMARY OF THE INVENTION

The present invention is intended to overcome the above-mentioned disadvantages. In the present invention, the cell has conductive plates as current collectors, the plates having numerous convexities or projections on the surface. For example, the plate may be a lath plate, wire-netting or punched metal having cut-out edges at the top of the punched out perforations. The numerous convexities of the current collector are welded to the edges of each of the electrodes.

DESCRIPTION OF THE PREFERRED EMBODIMENT

Figure 1:
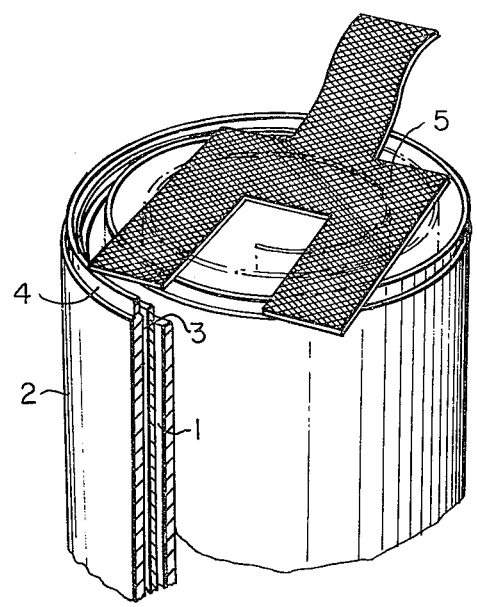
FIG. 1 shows a partial perspective view of a cell-assembly of electrodes and a separator with a current collector of the present invention.
Figure 2A:
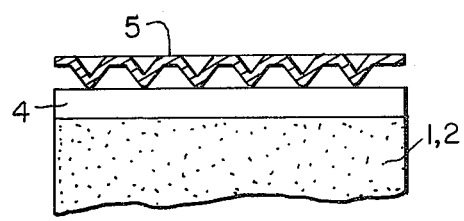
FIG. 2 shows a large scale view of a welded portion between the current collector and the one end of said assembly, in which A shows a lath plate, B shows a punched metal and C shows a wire-netting respectively as the current collector.
Figure 2B:
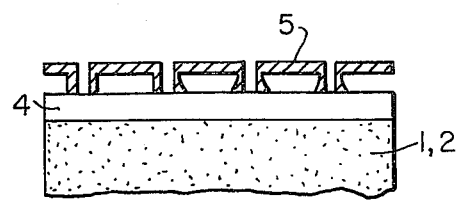
Figure 2C:
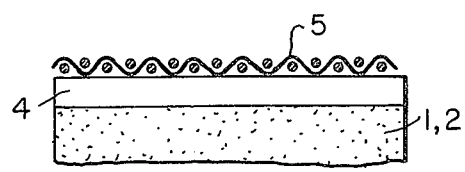

Referring to FIG. 1, 1 and 2 are positive and negative electrodes, each made of a metal carrier such as a punched metal or a woven wire screen and with a sintered fine nickel powder on it and impregnated with an active material, 3 is a separator, interposed between the pair of electrodes 1 and 2. 4 is an edge portion projecting from one of the electrodes which is bare and conductive. The current collector 5 comprises a metal member having a plurality of convexities or projections. Each convexity forms a contact point with a corresponding edge portion 4 of the electrodes 1 or 2.

Figure 3:
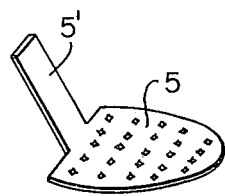
FIGS. 3 and 4 show other embodiments of the current collector of the present invention.

Since the current collector is welded to the electrode at each contact point, the numerous convexities guarantee a strong joint between them. Because of lower conductivity between the welding poles through the current collector material, current loss in the welding process is minimized, which makes a series spot welding process possible using a pair of welding poles 6 and 7 disposed on the current collector. As used herein, the term "series spot welding" means a welding process which makes at least two welding spots to form at least one closed circuit. Lower conductivity between the welding poles minimizes current loss between the welding poles and permits the use of a round current collector as shown in FIG. 3.

The current collector 5, welded to the edge portion 4, consists of a conductive material having numerous convexities on it such as a lath metal plate, a wire netting or woven wire or a punched metal plate.

In one of the preferred embodiments, the lath plate made of thin iron film 0.3 mm thick has numerous openings of a rhombus shape formed therein. The openings are formed by a pressing and extending process, using a pair of formers with numerous tapered cutting edges.

Figure 5:
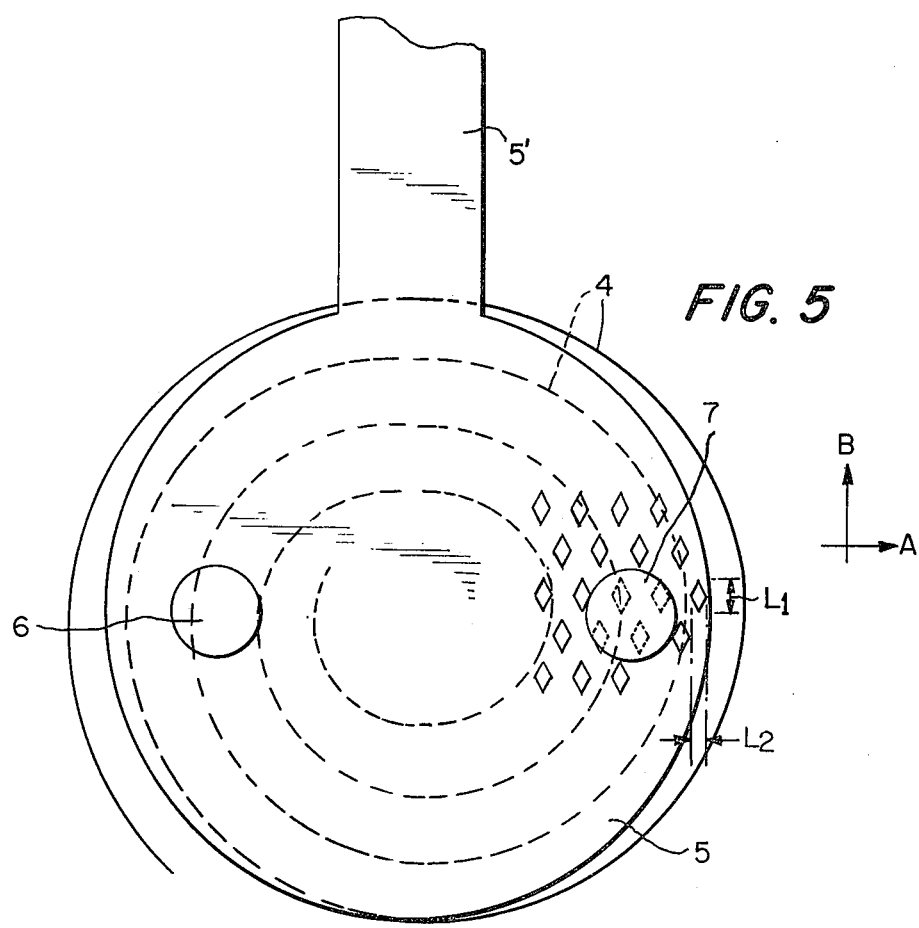
FIG. 5 shows an enlarged and partially modified view of FIG. 3.

As shown in FIG. 5, a pair of welding poles 6, 7 are disposed along with the shorter diagonal line (A) of the rhombus shaped openings and the current collector tab 5' extends in the direction of the longer diagonal line (B) of the rhombus shaped openings. Thus, an effective series spot welding process can be accomplished because of minimum current loss in the direction (A) through the current collector and efficient current collecting can be achieved as well, because of minimum resistance in the direction (B). In the preferred embodiment, the long diagonal of the rhombus $l_1 = 0.7$–$0.9$ mm and the short diagonal $l_2 = 0.4$–$0.8$ mm with $l_1/l_2 = 3/2$.

This configuration is based upon the fact, found by the inventors, that the conductivity of the current collector 5 in the direction (B) is much higher than that in the direction (A) so far as the spot welding current is concerned. The longer current path around the rhombus shaped openings in the direction (A) compared with the shorter one in the direction (B) explains this phenomenum.

Welding parts between electrodes and the current collector and their condition can be observed more clearly in FIGS. 2A, B, C in each embodiment.

Figure 4:
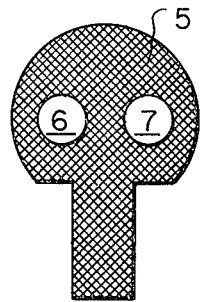

As observed in each figure, the current collector 5 contacts the electrode with moderate pressure. As shown in FIG. 4, a conductive metal plate 5 having numerous projections at its surface can be also substituted for the current collector. In this case, as the electric resistance of the current collector tab 5' is smaller than other cases, it is effective for current collecting.

The current collector is welded to each electrode respectively in the following manner. A basic assembly is formed by rolling both electrodes, which are separated by the separator, into a tight roll or into a block shape with bared edge portions of the carrier plates projecting outwardly from respective electrodes at opposite sides or ends of the assembly. A current collector of a lath plate being 0.3 mm in thickness with a 20% hole to plane ratio, is then placed on the top of the assembly. The welding current of about 800 Ampere is applied twice for (6/1000) – (7/1000) second to each wing of the current collector throuch a pair of welding electrodes exerting a pressure of about 8kg/cm$^2$ on the current collector.

As shown in FIG. 2, numerous convexities on the surface of the current collector provide point contact with corresponding edge portion of the electrode thereby providing a firm weld.

Table I shows a comparison between a cell of the present invention and those of the prior art.

TABLE I

|  | A | B | C |
| --- | --- | --- | --- |
| Internal resistance | 4mΩ | 6.5mΩ | 8mΩ |
| Shunt current | 140.0A | 116.5A | 88.7A |
| Capacity (at 0.2c) | 1310mAH | 1324mAH | 1357mAH |
| Ratio of capacity (at 1c) | 92.3% | 90.8% | 90.3% |
| Ratio of capacity (at 2c) | 88.5% | 83.5% | 84.8% |
| Ratio of capacity (at 4c) | 79.9% | 78.2% | 80.0% |
| Ratio of capacity (at 8c) | 64.3% | 60.1% | 58.5% |
| Charge efficiency 0.1C × 8Hr (charge) 0.2C (discharge) | 97.0% | 95.3% | 92.0 |
| Welding strength of the current collector | 10kg | 3kg | — |

In Table I, A is a cell embodying the present invention, B is a cell as disclosed in U.S. Pat. No. 3,732,124 and C is a cell in which the current collector portion is formed on the metal carrier by a punching process prior to the sintering process.

In the present invention, since the entire surface of the current collectors are welded to the edges of each electrode, the interior resistance is decreased and the rate of charge is increased. Furthermore, the joint between the current collector and the edges of electrode is much stronger.

Further, in the present invention, since the current collector and the electrode are welded in a point to edge relationship, the bared projecting area of electrode edge can be minimized so that more active material can be impregnated in the sintered plate. The flexibility of the collector permits large tolerances in relation to unevenness in the levels of the projecting bared parts of the electrode and decrease the defect rate in the welding process.

It will be understood easily that invention is also applicable to a cell with alternately stacked electrodes.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore to be embraced therein.

We claim:

1. An alkaline battery comprising an electrode assembly of a positive and a negative electrode separated by a separator, one of said electrodes having a bare conductive portion at one end of said assembly and the other electrode having a bare conductive portion at the other end of said assembly, a first current collector means having a current collector tab and a current collector welded to said positive electrode and covering substantially all of said positive electrode and a second current collector means welded to said negative electrode, said first and second current collector means each comprising a thin flexible metal plate having a plurality of non-circular holes with the longer diameter thereof aligned in the same direction and a plurality of projections formed on each said current collector means, said projections being welded to each said conductive portion with a pair of spot welding poles disposed on the outer surface of said current collector, wherein said current collector tab extends from said current collector in the same direction as the longer diameter of said holes, and wherein said projections form welded conductive points with said conductive portions of said assembly.

2. An alkaline battery as claimed in claim 1, wherein said non-circular holes are rhombic, each rhombus being aligned in the same direction.

3. An alkaline battery as claimed in claim 2, wherein said current collector is a thin conductive lath plate 0.3mm in thickness with a 20% hole to plane ratio.

4. An alkaline battery comprising an assembly of a positive and a negative electrode and a separator, each said electrodes having a bare conductive portion at an opposite end of said assembly, a first current collector means having a current collector tab and a current collector welded to said positive electrode and covering substantially all of said positive electrode and a second current collector means welded to said negative electrode, each of current collector means comprising a thin flexible lath plate having a plurality of rhombus shaped holes, the longer diagonal thereof aligned in the direction which said current collector tab extends from, said current collector, said lath plate also including a plurality of projections formed thereon, said projections being welded to said conductive portion with a pair of spot welding poles disposed in the direction of the shorter diagonal of said rhombic holes.

5. An alkaline battery as claimed in claim 4, wherein said current collector is a lath plate 0.3mm in thickness with a 20% hole to plane ratio.

* * * * *